US008522473B2

(12) United States Patent  (10) Patent No.: US 8,522,473 B2
Nakanishi  (45) Date of Patent: Sep. 3, 2013

(54) COLORED YARN OBJECT, PROCESS FOR PRODUCING THE SAME, AND FISHING LINE

(75) Inventor: Shigeru Nakanishi, Minamiawaji (JP)

(73) Assignee: Yoz-Ami Corporation, Hyogo (JP)

( * ) Notice: Subject to any disclaimer, the term of this patent is extended or adjusted under 35 U.S.C. 154(b) by 612 days.

(21) Appl. No.: 12/223,065

(22) PCT Filed: Dec. 28, 2006

(86) PCT No.: PCT/JP2006/326214
§ 371 (c)(1),
(2), (4) Date: Jul. 22, 2008

(87) PCT Pub. No.: WO2007/083511
PCT Pub. Date: Jul. 26, 2007

(65) Prior Publication Data
US 2010/0229456 A1 Sep. 16, 2010

(30) Foreign Application Priority Data
Jan. 23, 2006  (JP) ................................. 2006-013560

(51) Int. Cl.
*A01K 91/00* (2006.01)
(52) U.S. Cl.
USPC .......................... 43/44.98; 87/7; 87/8; 87/13
(58) Field of Classification Search
USPC ..................... 43/44.98; 87/7, 8, 13
See application file for complete search history.

(56) References Cited

U.S. PATENT DOCUMENTS

| | | | | |
|---|---|---|---|---|
| 1,394,616 A | * | 10/1921 | Fredricks | 43/44.98 |
| 1,578,189 A | * | 3/1926 | Arthur Dawson Charles | 43/44.98 |
| 1,830,411 A | * | 11/1931 | Schork, Jr. | 43/44.98 |
| 1,846,912 A | * | 2/1932 | Sedgley | 43/44.98 |
| 1,982,304 A | * | 11/1934 | Holden | 43/44.98 |

(Continued)

FOREIGN PATENT DOCUMENTS

| CN | 2731978 | 10/2005 |
|---|---|---|
| EP | 1 306 471 | 5/2003 |

(Continued)

OTHER PUBLICATIONS

International Search Report issued Mar. 6, 2007 in the International (PCT) Application of which the present application is the U.S. National Stage.

(Continued)

*Primary Examiner* — Darren W Ark
(74) *Attorney, Agent, or Firm* — Wenderoth, Lind & Ponack, L.L.P.

(57) ABSTRACT

A yarn object which, even though made of ultra-high-molecular-weight polyethylene, can be satisfactorily prevented from color fading caused by contact with other objects or the like, can be produced easily at low cast, and can maintain high strength. The yarn object is colored with a colorant. The yarn object includes a core yarn 2 colored with a predetermined colorant and an outer-layer yarn 3 disposed on the periphery of the core yarn. The outer-layer yarn 3 is disposed in such a manner that the core yarn 2 is prevented from contacting with other objects. The outer-layer yarn 3 includes a transparent filament and a space 4 is formed between the outer-layer yarns 3. The color applied to the core yarn 2 is externally visible through the transparent outer-layer yarn 3 and the space therebetween 4.

3 Claims, 1 Drawing Sheet

(56) References Cited

U.S. PATENT DOCUMENTS

| | | | | |
|---|---|---|---|---|
| 2,065,606 | A * | 12/1936 | Moore | 43/44.98 |
| 2,215,760 | A * | 9/1940 | Ledrich | 43/44.98 |
| 2,250,832 | A * | 7/1941 | Hedge | 43/44.98 |
| 2,253,048 | A * | 8/1941 | Quindry | 87/8 |
| 2,257,953 | A * | 10/1941 | Haskell | 87/6 |
| 2,400,181 | A * | 5/1946 | Warren, Jr. | 57/231 |
| 2,401,291 | A * | 5/1946 | Smith | 57/242 |
| 2,536,312 | A * | 1/1951 | Saether | 43/44.98 |
| 2,610,539 | A * | 9/1952 | Hedge | 43/44.98 |
| 2,687,673 | A * | 8/1954 | Boone | 57/210 |
| 2,809,458 | A * | 10/1957 | Wilbourn | 43/44.98 |
| 2,933,798 | A * | 4/1960 | Miller et al. | 43/44.98 |
| 3,369,317 | A * | 2/1968 | Brownell | 43/44.98 |
| 3,793,822 | A * | 2/1974 | Kawai | 43/7 |
| 3,805,667 | A * | 4/1974 | Orser | 87/6 |
| 3,830,009 | A * | 8/1974 | Collingbourne | 43/44.98 |
| 3,849,929 | A * | 11/1974 | Martuch | 43/44.98 |
| 3,868,785 | A * | 3/1975 | Foote | 43/44.98 |
| 3,888,037 | A * | 6/1975 | Warthen | 43/44.98 |
| 3,936,335 | A * | 2/1976 | Martuch | 43/44.98 |
| 3,968,725 | A * | 7/1976 | Holzhauer | 87/6 |
| 4,321,854 | A * | 3/1982 | Foote et al. | 43/44.98 |
| 4,336,087 | A * | 6/1982 | Martuch et al. | 43/44.98 |
| 4,449,353 | A * | 5/1984 | Tayebi | 57/242 |
| 4,466,331 | A * | 8/1984 | Matheson | 43/7 |
| 4,550,938 | A * | 11/1985 | Nakanishi et al. | 43/44.98 |
| 4,604,821 | A * | 8/1986 | Moser | 43/44.98 |
| 4,876,818 | A * | 10/1989 | Fralick et al. | 43/7 |
| 4,947,727 | A * | 8/1990 | Momoi | 57/210 |
| 5,145,172 | A * | 9/1992 | Takashima | 428/377 |
| 5,296,292 | A * | 3/1994 | Butters | 43/44.98 |
| 5,327,714 | A * | 7/1994 | Stevens et al. | 57/230 |
| 5,540,990 | A * | 7/1996 | Cook | 43/44.98 |
| 5,625,976 | A * | 5/1997 | Goodale | 43/44.98 |
| 5,647,160 | A * | 7/1997 | Anderson | 43/10 |
| 5,659,994 | A * | 8/1997 | Cutter et al. | 43/44.98 |
| 5,819,464 | A * | 10/1998 | Jovanovich | 43/10 |
| 5,881,492 | A * | 3/1999 | Abiru et al. | 43/44.98 |
| 5,901,632 | A * | 5/1999 | Ryan | 87/8 |
| 6,148,597 | A * | 11/2000 | Cook | 43/44.98 |
| 6,167,650 | B1 * | 1/2001 | Duback | 43/44.98 |
| 6,204,317 | B1 * | 3/2001 | Lilly | 524/223 |
| 6,214,264 | B1 * | 4/2001 | Aneja | 264/103 |
| 6,218,007 | B1 * | 4/2001 | Russell et al. | 428/364 |
| 6,357,164 | B1 * | 3/2002 | Safwat et al. | 43/9.95 |
| 6,421,950 | B1 * | 7/2002 | Constantin | 43/44.98 |
| 6,434,879 | B1 * | 8/2002 | Safwat et al. | 43/9.95 |
| 6,460,321 | B1 * | 10/2002 | Koshimae et al. | 57/258 |
| 6,615,532 | B2 * | 9/2003 | Abel | 43/7 |
| 6,732,468 | B2 * | 5/2004 | Safwat et al. | 43/9.1 |
| 6,945,153 | B2 * | 9/2005 | Knudsen et al. | 87/7 |
| 7,029,490 | B2 * | 4/2006 | Grafton et al. | 606/228 |
| 7,081,298 | B2 * | 7/2006 | Nakanishi | 43/44.98 |
| 7,100,352 | B2 * | 9/2006 | Robins | 57/210 |
| 7,228,777 | B2 * | 6/2007 | Morissette et al. | 87/8 |
| 7,240,599 | B2 * | 7/2007 | Nolan | 87/8 |
| 7,624,529 | B2 * | 12/2009 | Abel | 43/7 |
| 7,703,371 | B2 * | 4/2010 | Morissette et al. | 87/8 |
| 7,866,245 | B2 * | 1/2011 | Kempf et al. | 87/8 |
| 8,137,809 | B2 * | 3/2012 | Marissen et al. | 428/364 |
| 8,241,748 | B2 * | 8/2012 | Argoitia | 428/365 |
| 2003/0145574 | A1 * | 8/2003 | Delvael | 57/258 |
| 2004/0144014 | A1 * | 7/2004 | Abel | 43/11 |
| 2004/0200120 | A1 * | 10/2004 | Safwat et al. | 43/9.1 |
| 2005/0160656 | A1 * | 7/2005 | Safwat et al. | 43/9.95 |
| 2005/0172540 | A1 * | 8/2005 | Mizen | 43/44.98 |
| 2005/0229469 | A1 * | 10/2005 | Able | 43/12 |
| 2006/0207414 | A1 * | 9/2006 | Nye | 87/7 |
| 2006/0272196 | A1 * | 12/2006 | Safwat et al. | 43/9.95 |
| 2007/0014988 | A1 * | 1/2007 | Tseng | 428/375 |
| 2007/0079695 | A1 * | 4/2007 | Bucher et al. | 87/8 |
| 2007/0145630 | A1 * | 6/2007 | Simmelink et al. | 264/165 |
| 2008/0021501 | A1 * | 1/2008 | Schmieding | 428/364 |
| 2008/0127543 | A1 * | 6/2008 | Wothers | 43/44.98 |
| 2009/0117805 | A1 * | 5/2009 | Simmelink et al. | 442/392 |
| 2010/0122486 | A1 * | 5/2010 | Osada et al. | 43/7 |
| 2010/0122517 | A1 * | 5/2010 | Simmelink et al. | 57/200 |
| 2010/0192758 | A1 * | 8/2010 | Clough | 87/8 |
| 2010/0227167 | A1 * | 9/2010 | Tsai | 428/375 |
| 2010/0229521 | A1 * | 9/2010 | Yamamoto et al. | 57/258 |
| 2010/0249831 | A1 * | 9/2010 | Vlasblom et al. | 606/228 |
| 2010/0268331 | A1 * | 10/2010 | Simmelink et al. | 428/364 |
| 2010/0274282 | A1 * | 10/2010 | Olson | 87/8 |
| 2010/0286728 | A1 * | 11/2010 | Simmelink et al. | 606/228 |
| 2012/0118131 | A1 * | 5/2012 | Erlendsson et al. | 87/8 |
| 2012/0174464 | A1 * | 7/2012 | Safwat | 43/9.7 |
| 2012/0198808 | A1 * | 8/2012 | Bosman et al. | 87/13 |
| 2012/0285074 | A1 * | 11/2012 | Yang | 43/44.98 |
| 2012/0295046 | A1 * | 11/2012 | Levesque | 87/8 |

FOREIGN PATENT DOCUMENTS

| | | | |
|---|---|---|---|
| EP | 2128316 A1 * | | 12/2009 |
| JP | 3-147729 | | 6/1991 |
| JP | 4-004832 | | 1/1992 |
| JP | 04257386 A * | | 9/1992 |
| JP | 04335849 A * | | 11/1992 |
| JP | 06200207 A * | | 7/1994 |
| JP | 7-229031 | | 8/1995 |
| JP | 9-28250 | | 2/1997 |
| JP | 09154457 A * | | 6/1997 |
| JP | 9-209214 | | 8/1997 |
| JP | 10327724 A * | | 12/1998 |
| JP | 10337139 A * | | 12/1998 |
| JP | 11000087 A * | | 1/1999 |
| JP | 11032633 A * | | 2/1999 |
| JP | 2002038350 A * | | 2/2002 |
| JP | 2002084942 A * | | 3/2002 |
| JP | 2002084943 A * | | 3/2002 |
| JP | 2002095396 A * | | 4/2002 |
| JP | 2002233280 A * | | 8/2002 |
| JP | 2002-266183 | | 9/2002 |
| JP | 2002262741 A * | | 9/2002 |
| JP | 2002266183 A * | | 9/2002 |
| JP | 2003253527 A * | | 9/2003 |
| JP | 2003-286622 | | 10/2003 |
| JP | 2004-84148 | | 3/2004 |
| JP | 2004084148 A * | | 3/2004 |
| JP | 2004-218163 | | 8/2004 |
| JP | 2004-308047 | | 11/2004 |
| JP | 2008283933 A * | | 11/2008 |
| JP | 2009077699 A * | | 4/2009 |
| WO | WO 9520703 A1 * | | 8/1995 |
| WO | WO 2009116381 A1 * | | 9/2009 |

OTHER PUBLICATIONS

Supplementary European Search Report issued Oct. 15, 2009 in European Application No. EP 06 84 3592.

* cited by examiner

COLORED YARN OBJECT, PROCESS FOR PRODUCING THE SAME, AND FISHING LINE

This application is a U.S. national stage of International Application No. PCT/JP2006/326214 filed Dec. 28, 2006.

TECHNICAL FIELD

The present invention relates to a colored yarn object, a process for producing the same, and a fishing line. In more details, the present invention relates to a colored yarn object, which can be satisfactorily prevented from color fading caused by contact with other objects or the like, can be produced easily at low cost, and can maintain high strength, even though the colored yarn object comprises a filament made of ultra-high-molecular-weight polyethylene or the like inferior in colorability, a process for producing the same, and a fishing line by making use of the colored yarn object.

BACKGROUND ART

A fishing line including a yarn object made of ultra-high-molecular-weight polyethylene, which currently has begun to be widely used in the field of fishing lines, has high strength and low elongation rate, and therefore has advantages of allowing accurate adjustment of the depth to fish and easy perception of a fish strike even when used as a long fishing line.

Each predetermined length of a fishing line of this kind is colored in a different color for accurate adjustment of the depth to fish. However, since the above-mentioned ultra-high-molecular-weight polyethylene has inferior colorability, weak adhesiveness to a binder or the like, and low heat resistance as compared with polyamide or the like, fixing a colorant onto the yarn object is not easy. Therefore, using the colored fishing line including a yarn object made of ultra-high-molecular-weight polyethylene causes problems: the color of the fishing line fades at an early stage; a colorant stains hands and clothes of an angler; color migration occurs within the fishing line while the line is repeatedly reeled and unreeled.

To solve these problems, for example, it is proposed to form a covering layer comprising a particular colored composition containing a vinylidene chloride resin and a pigment on the surface of a yarn object made of ultra-high-molecular-weight polyethylene (for example, refer to Japanese Unexamined Patent Publication No. 7-229031).

DISCLOSURE OF THE INVENTION

Problems to be Solved by the Invention

The above-mentioned colored composition is not necessarily sufficient in adhesiveness to a filament, and the problem is that color fading and color migration occur at an early stage in actual use. In addition, as the colored composition is formed on the surface of a yarn object that frequently contacts with other objects, the composition needs to be thickly formed for improved durability (durability of coloring). This causes another problem of decreasing the per-thickness relative strength of the whole yarn object because the resin in the colored composition has lower mechanical strength than the filament composing the yarn object. Further, as the covering layer in which the resin is used covers the whole surface of the yarn object filmily, compatibility between durability and flexibility of the yarn object cannot be easily achieved. In addition, the covering layer cannot be produced at a low cost because the resin used need to have particular properties in strength, water absorption property, and the like.

An object of the present invention is to solve the problems in order to provide a colored yarn object, which can be satisfactorily prevented from color fading caused by contact with other objects or the like, can be produced easily at low cost, and can maintain high strength, even though the colored yarn object comprises a filament made of ultra-high-molecular-weight polyethylene or the like inferior in colorability, a process for producing the same, and a fishing line by making use of the colored yarn object.

Means for Solving the Problem

In order to solve the problems, the present invention is constituted in the following manner when described on the basis of FIGS. 1 and 2 showing embodiments of the present invention, for example.

That is, the first aspect of the present invention is a yarn object colored with a colorant, the yarn object comprising a core yarn 2 colored with a predetermined colorant and an outer-layer yarn 3 disposed on the periphery of the core yarn in such a manner that the core yarn 2 is prevented from contacting with other objects, the outer-layer yarn 3 being constituted in such a manner that color applied to the core yarn 2 is externally visible.

The second aspect of the present invention is a process for producing a yarn object colored with a colorant, the process comprising coloring a core yarn 2 with a predetermined colorant, and then disposing an outer-layer yarn 3 on the periphery of the core yarn 2 in such a manner that the core yarn 2 is prevented from contacting with other objects and that color applied to the core yarn 2 is externally visible through at least either of the outer-layer yarn 3 or a space 4 between the outer-layer yarns 3.

A third aspect of the present invention relates to a fishing line comprising the colored yarn object 1 of the first aspect.

In details, the present invention relates to:

(1) a yarn object colored with a colorant, comprising a core yarn 2 colored with a predetermined colorant and an outer-layer yarn 3 disposed on the periphery of the core yarn in such a manner that the core yarn 2 is prevented from contacting with other objects, the outer-layer yarn 3 being constituted-in such a manner that color applied to the core yarn 2 is externally visible;

(2) the colored yarn object according to the above-mentioned (1), wherein the outer-layer yarn 3 comprises a transparent or semi-transparent filament, and the applied color is externally visible through the outer-layer yarn 3;

(3) the colored yarn object according to the above-mentioned (1) or (2), wherein the outer-layer yarn 3 is made transparent or semi-transparent by containing a surface-treatment agent, and thereby the color is externally visible through the outer-layer yarn 3;

(4) the colored yarn object according to any one of the above-mentioned (1) to (3), wherein the outer-layer yarn 3 is disposed in a braid or spiral form on the periphery of the core yarn 2, a space 4 is formed between these outer-layer yarns 3, and the applied color is externally visible through the space 4; and (5) the colored yarn object according to any one of the above-mentioned (1) to (4), wherein the core yarn 2 is obtained by combining a plurality of filaments made of ultra-high-molecular-weight polyethylene.

Further, the present invention relates to:

(6) a process for producing a yarn object colored with a colorant, comprising coloring a core yarn 2 with a predetermined colorant, and then disposing an outer-layer yarn 3 on the periphery of the core yarn 2 in such a manner that the core yarn 2 is prevented from contacting with other objects and that color applied to the core yarn 2 is externally visible through at least either of the outer-layer yarn 3 or a space 4 between the outer-layer yarns 3;

(7) the process for producing a colored yarn object according to the above-mentioned (6), wherein the colorant for coloring the core yarn 2 contains an adhesive component for bonding the core yarn 2 and the outer-layer yarn 3;

(8) the process for producing a colored yarn object according to the above-mentioned (6) or (7), wherein the outer-layer yarn 3 is disposed by being wound around the core yarn 2 in a spiral form;

(9) the process for producing a colored yarn object according to the above-mentioned (6) or (7), wherein the outer-layer yarn 3 is disposed by being woven around the core yarn 2 in a braid form;

(10) the process for producing a colored yarn object according to any one of the above-mentioned (6) to (9), wherein the outer-layer yarn 3 comprises a transparent or semi-transparent filament, and the applied color is externally visible through the outer-layer yarn 3;

(11) the process for producing a colored yarn object according to any one of the above-mentioned (6) to (10), wherein the outer-layer yarn 3 is made transparent or semi-transparent by containing a surface-treatment agent, and thereby the color is externally visible through the outer-layer yarn 3;

(12) the process for producing a colored yarn object according to any one of the above-mentioned (6) to (11), wherein the outer-layer yarn 3 is disposed on the periphery of the core yarn 2, and then subjected to a heat treatment to improve the adhesiveness of the outer-layer yarn 3 to the core yarn 2;

(13) the process for producing a colored yarn object according to any one of the above-mentioned (6) to (12), wherein the outer-layer yarn 3 is disposed on the periphery of the core yarn 2, and then subjected to a drawing treatment to improve the adhesiveness of the outer-layer yarn 3 to the core yarn 2;

(14) the process for producing a colored yarn object according to any one of the above-mentioned (6) to (13), wherein a space 4 is formed between the outer-layer yarns 3, and the applied color is externally visible through the space 4; and

(15) the process for producing a colored yarn object according to any one of the above-mentioned (6) to (14), wherein the core yarn 2 is obtained by combining a plurality of filaments made of ultra-high-molecular-weight polyethylene.

Still further, the present invention relates to:

(16) a fishing line comprising the colored yarn object according to any one of the above-mentioned (1) to (5); and

(17) the fishing line according to the above-mentioned (16), wherein each predetermined length of the core yarn 2 of the colored yarn object is colored in a different color.

The surface of the core yarn colored with a colorant is protected by the outer-layer yarn disposed on the periphery of the core yarn, so that the yarn object is prevented from contacting with another yarn object or other objects. Color applied to the core yarn is externally well visible through the outer-layer yarn and a space therebetween. In addition, since a filament having as high mechanical strength as the core yarn may be used in the outer-layer yarn, mechanical strength such as tenacity of the whole colored yarn object can be well maintained.

The outer-layer yarn may be disposed so as to entirely cover the surface of the core yarn, or when disposed in a braid or spiral form on the periphery of the core yarn for example, a space may be formed between the outer-layer yarns as long as the core yarn does not contact with other objects.

The constitution allowing color applied to the core yarn to be externally visible through the outer-layer yarn may be, for example, a constitution where a transparent or semi-transparent filament is used in the outer-layer yarn, and the applied color is externally visible through the outer-layer yarn. Further, in a constitution where the outer-layer yarn is disposed in a braid or spiral form to form a space between the outer-layer yarns, the color is externally visible through the space, and using the transparent or semi-transparent filament and the space between the outer-layer yarns in combination makes the color externally more visible.

In particular, in a case where the outer-layer yarn comprises multiple filaments, diffuse reflection from these filaments may decrease the transparency of the whole outer-layer yarn even though each of the filaments is transparent or semi-transparent. In this case, however, transparency of the whole outer-layer yarn can be improved by applying liquid such as water to the yarn object. Accordingly, applying such a yarn object to a fishing line provides an excellent external visibility of the color of the core yarn because when the fishing line is in use and guided into water, the whole outer-layer yarn gets wet and favorably transparent.

The above-mentioned characteristics are preferably utilized in that the color is externally well visible through the outer-layer yarn when the outer-layer yarn contains a transparent or semi-transparent surface-treatment agent to make the whole outer-layer yarn transparent or semi-transparent, or to improve the transparency of the whole outer-layer yarn. As the surface-treatment agent, materials having no negative influence on the filament and colorant may be used. Specifically, examples thereof include an impregnating agent such as silicone oil and a coating material such as a silicone resin and fluororesin, and may be any agent as long as the inclusion thereof makes the whole outer-layer yarn transparent or semi-transparent or improves the transparency of the whole outer-layer yarn. To improve the transparency, it is more preferable that the refractive index of the surface-treatment agent is similar to that of the resin forming the outer-layer yarn.

The outer-layer yarn preferably adheres firmly to the core yarn so as to make color applied to the core yarn externally well visible. Specific examples of a means of improving the adhesiveness of the outer-layer yarn to the core yarn include a method wherein the outer-layer yarn is disposed on the periphery of the core yarn, and then subjected to a heat treatment or a drawing treatment, and yet are not limited thereto. Besides by improving the adhesiveness, color applied to the core yarn can be made externally well visible by impregnating an interface between the outer-layer yarn and the core yarn with a transparent or semi-transparent surface-treatment agent, as well as by making a space between the above-mentioned outer-layer yarns contain a transparent or semi-transparent surface-treatment agent.

The above-mentioned core yarn is not limited to specific materials, and general-purpose synthetic resin fibers such as a polyamide fiber and a polyester fiber may be used, but yet for a fishing line, a yarn object obtained by combining a plurality of filaments made of ultra-high-molecular-weight polyethylene is particularly preferable because of its high strength and low elongation rate. The core yarn may be an untwisted yarn or a twisted yarn obtained by combining a plurality of filaments, or a braided yarn. Needless to say, the use of a plurality of filaments combined into one includes the use as a braided yarn.

On the other hand, the above-mentioned outer-layer yarn is also not limited to specific materials, and general-purpose synthetic fibers such as polyamide, polyester and acryl, and a high-function fiber such as ultra-high-molecular-weight polyethylene may be used as the transparent or semi-transparent outer-layer yarn because most synthetic fibers are transparent or semi-transparent. Especially, using a high-function fiber made of ultra-high-molecular-weight polyethylene or the like for both the core yarn and the outer-layer yarn is preferable because thereby the per-thickness (dtex) strength of the whole yarn object can be highly maintained.

As the colorant for coloring the above-mentioned core yarn, general-purpose dyestuffs and pigments as well as colorant with improved discoloration and adhesion properties can be used, which may be either water-soluble or water-insoluble.

Further preferably, these colorants contain a resin composition and the like for improvement of adhesion between the core yarn and the outer-layer yarn. In many cases, various kinds of adhesive resin compositions appropriate for materials of the outer-layer yarn, such as a polyolefin resin, a polyamide resin, a polyester resin, a polyurethane resin and an acrylic resin, are used between the core yarn and the outer-layer yarn. Therefore, the above-mentioned colorants preferably contain these adhesive resin compositions in order that the surface-treatment agent and the colorant can be simultaneously applied to the surface of the core yarn, which enables low-cost production owing to reduced number of times of applications, and restrains the increase of the yarn object weight by decreasing the application amount.

Advantageous Effect of the Invention

The present invention has constitutions and functions as described above to provide the following effects.

(1) Color applied to the core yarn is externally well visible through the above-mentioned outer-layer yarn and a space between the outer-layer yarns, so that the visibility of the yarn object can be excellently fully provided. In addition, the surface of the above-mentioned colored core yarn is protected by the outer-layer yarn disposed on the periphery of the core yarn, and therefore the yarn object is prevented from contacting with another yarn object or other objects, so that the yarn object, even including filaments made of ultra-high-molecular-weight polyethylene and the like having inferior colorability, can be favorably prevented from fading caused by contact with other objects, from staining hands and clothes of an angler with the colorant, and from causing color migration within the fishing line while the line is repeatedly reeled and unreeled.

(2) The core yarn can be colored with a general-purpose colorant by an ordinary method, and the outer-layer yarn can be disposed on the periphery of the core yarn by an ordinary method. Therefore, the production can be easily performed at low cost as compared with the above-mentioned prior art wherein a particular colored composition is used.

(3) A filament having high mechanical strength such as an ultra-high-molecular-weight polyethylene fiber as well as a general-purpose synthetic fiber can be used for the outer-layer yarn, so that the per-thickness strength of the whole colored yarn object can be highly maintained.

DESCRIPTION OF REFERENCE NUMERALS

1 Colored yarn object
2 Core yarn
3 Outer-layer yarn
4 Space

BEST MODE FOR CARRYING OUT THE INVENTION

The embodiments of the present invention will be hereinafter described on the basis of the drawings.

Figure 1:
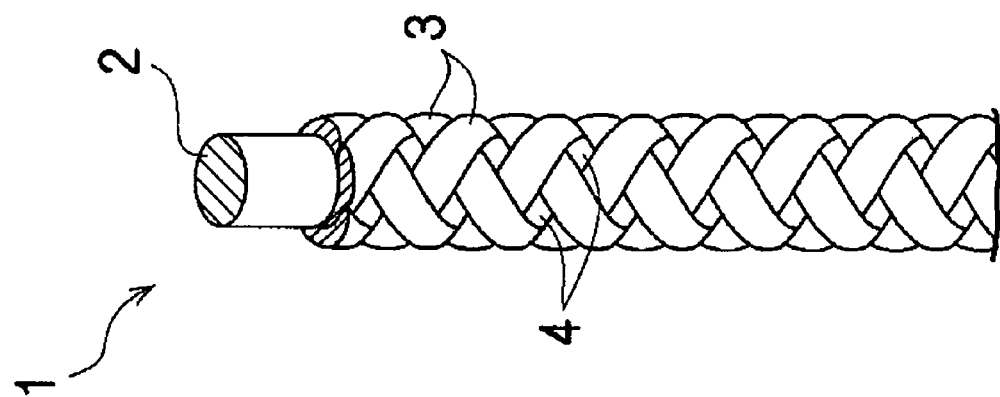
FIG. 1 is an enlarged schematic configuration diagram of the principal part of a yarn object, showing a first embodiment of the present invention.

FIG. 1 is an enlarged schematic configuration diagram of the principal part of a yarn object, showing a first embodiment of the present invention.

As shown in FIG. 1, a yarn object 1 comprises a core yarn 2 and an outer-layer yarn 3 disposed on the periphery of the core yarn. The core yarn 2 comprises a twisted or untwisted yarn of 200 dtex obtained by combining a plurality of filaments made of ultra-high-molecular-weight polyethylene, for example. Each predetermined length of this core yarn 2 is colored in a different color.

Four outer-layer yarns 3 are woven around the core yarn 2 in a braided form, and a space 4 is formed between the outer-layer yarns 3. Each of the outer-layer yarns 3 is transparent and comprises a twisted or untwisted yarn of 50 dtex obtained by combining filaments made of ultra-high-molecular-weight polyethylene, for example. The outer-layer yarns 3 well adhere to the above-mentioned core yarn 2. However, diffuse reflection or the like from these filaments may decrease the transparency of the whole outer-layer yarn 3. To prevent this, the outer-layer yarns 3 contain a surface-treatment agent such as silicone oil, and thereby the transparency of the whole outer-layer yarns 3 is favorably maintained.

Color applied to the above-mentioned core yarn 2 is externally well visible through the outer-layer yarns 3 or the space 4 between the outer-layer yarns 3. The surface of the core yarn 2 exposed through this space 4 is sufficiently protected by the outer-layer yarns 3 around the core yarn, and is prevented from contacting with other objects or other sites of the yarn object 1. The width or size of the space 4 is not particularly limited as long as the core yarn 2 is prevented from contacting with other objects or other sites of the yarn object 1. In particular, the width or size is preferably approximately not more than 1 mm although it varies with the thickness of the yarn object 1. Alternatively, the width of the space 4 is preferably narrow enough to avoid contact between the core yarn 2 and the surface of another yarn object having a diameter of approximately 1 mm even when the yarn object 1 of the present invention and the other yarn object are placed along or across each other and are lightly pushed against each other.

With regard to the colorant used for the coloring of the core yarn 2, a part thereof may preferably penetrate into the filaments composing the outer-layer yarns 3 because thereby the color of this colorant is externally more visible. However, the colorant is adjusted so as not to penetrate to the surface of the outer-layer yarns 3.

Further, the colorant used for the coloring of the core yarn 2 contains a surface-treatment agent including an adhesive component such as a polyolefin resin composition, and thereby the core yarn 2 and outer-layer yarns 3 are favorably integrated to prevent the outer-layer yarns 3 from shifting on the surface of the core yarn 2.

Next, a process for producing the above-mentioned colored yarn object will be described.

First, each predetermined length of the core yarn 2 is colored in a different color by dipping or other ordinary methods with the use of a colorant including generally used dyestuffs and pigments appropriate for the color to be applied. This colorant contains a synthetic resin adhesive component of the same kind as the outer-layer yarns 3, such as a polyolefin resin composition.

Subsequently, the colorant applied to the above-mentioned core yarn 2 is dried, and then four transparent outer-layer yarns 3 are woven around the core yarn 2 in a braided form, and a space 4 is formed between the outer-layer yarns 3 by an ordinary method with the use of a braiding machine, and formed into a colored yarn object 1 shown in FIG. 1. At this time, the space 4 is formed between the outer-layer yarns 3. A part of the core yarn 2 may be exposed through this space 4. This space 4 is formed to have a size with which the exposed part of the core yarn 2 is sufficiently protected by the outer-layer yarns 3 on the periphery of the core yarn, and is prevented from contacting with other objects.

Next, with regard to the above-mentioned colored yarn object 1, a surface-treatment agent such as silicone oil is impregnated into the outer-layer yarns 3 by dipping or other ordinary methods, and then the outer-layer yarns 3 are subjected to a drawing treatment in an atmosphere heated to a temperature of approximately 80 to 160° C., for example, and the outer-layer yarns 3 are allowed to favorably adhere to the core yarn 2 by the heat treatment and drawing treatment. In this embodiment, the surface-treatment agent is impregnated into the outer-layer yarns previous to the heat treatment and drawing treatment. However, in the present invention, the surface-treatment agent may be impregnated into the outer-layer yarns after the heat treatment and drawing treatment. In the case of performing both heat treatment and drawing treatment in the present invention, either of them may be previously performed. Or both of them may be simultaneously performed.

Figure 2:
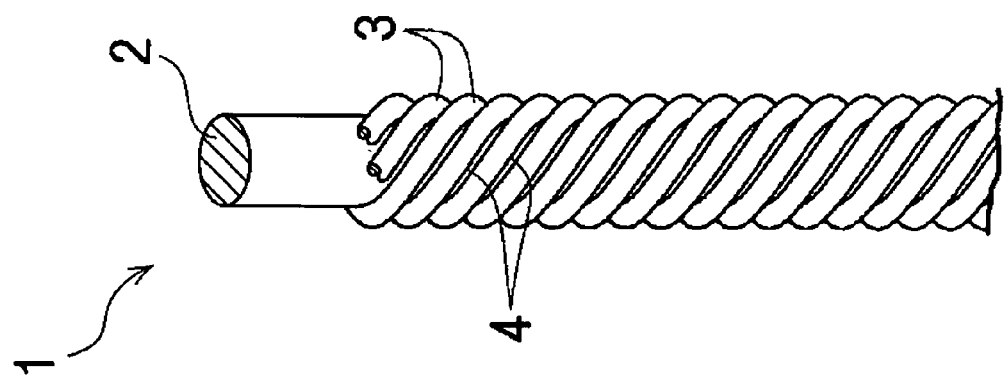
FIG. 2 is an enlarged schematic configuration diagram of the principal part of a yarn object, showing a second embodiment of the present invention.

FIG. 2 is an enlarged schematic configuration diagram of the principal part of a yarn object, showing a second embodiment of the present invention.

In this second embodiment, the outer-layer yarn 3 is wound around the core yarn 2 in a spiral form to form the yarn object 1 into a so-called covering yarn. At this time, the outer-layer yarn 3 is wound forming the space 4 on the surface of the core yarn 2. The rest of the constitution and the function are the same as in the first embodiment. Therefore, the descriptions are omitted.

A colored yarn object described in each of the above embodiments is illustrated for embodying a technical idea of the present invention, and the thickness and materials of a core yarn and an outer-layer yarn, components of a colorant, and the like, are not limited to these embodiments, and various modifications may occur without departing from the scope of the claims of the present invention.

Although the space 4 is formed between the outer-layer yarns 3 in each of the above embodiments, for example, the transparent outer-layer yarns 3 of the present invention may be woven or wound up so closely as not to create the space 4. Further, although the outer-layer yarns 3 is disposed on the periphery of the core yarn 2 in a monolayer state in each of the above-mentioned embodiments, the outer-layer yarns 3 of the present invention may be disposed on the periphery of the core yarn 2 in a multilayer state.

Further, although a twisted yarn and an untwisted yarn are used for the core yarn in the above-mentioned embodiments, a braided yarn may be used in the present invention. In addition, other general-purpose synthetic fibers such as polyamide, polyester and acryl, natural fibers, metal fibers, or the like, may be used for the above-mentioned core yarn and outer-layer yarn, and the core yarn and the outer-layer yarn may be made of different materials from each other. In the above-mentioned embodiments, an adhesive component is contained in a colorant. However, this may be omitted in the present invention.

In the above-mentioned embodiments, a surface-treatment agent such as silicone oil is impregnated into the outer-layer yarn. However, in the present invention, the surface-treatment agent may be other components including a silicone resin, and a means for making the outer-layer yarn contain the surface-treatment agent may be a different method from immersion. Further, when the outer-layer yarn is sufficiently transparent, the surface-treatment agent may be omitted.

In addition, the outer-layer yarn also may be colored as long as no significant impairment of the object of the invention, such as increased opacity and easy color fading or migration of the outer-layer yarn, is caused. In the case where the outer-layer yarn is colored, the core yarn and the outer-layer yarn may be colored in different colors, and a combination thereof can exhibit a particular color; when each predetermined length of the core yarn and/or the outer-layer yarn is colored in a different color, variation of color visually observed can be widened. A dappled color pattern can also be seen when the color seen through the space 4 and the color seen through the outer-layer yarn 3 differ from each other. Needless to say, "color applied to the core yarn 2 is externally visible" in the present invention also includes the case where color applied to the core yarn 2 is changed by passing through the outer-layer yarn, and the changed color is externally visible.

In addition, in the above embodiments, each predetermined length of a yarn object is colored in a different color, and thereby utilized appropriately for a fishing line; needless to say, a yarn object may be colored in a single color over the total length thereof, and can be used for applications other than a fishing line.

INDUSTRIAL APPLICABILITY

The present invention is a colored yarn object, which can be satisfactorily prevented from color fading caused by contact with other objects or the like, can be produced easily at low cost, and can maintain high strength, even though the colored yarn object comprises a filament made of ultra-high-molecular-weight polyethylene or the like inferior in colorability. The colored yarn object is particularly appropriate for a fishing line and also appropriately used for a yarn object in other applications.

The invention claimed is:

1. A fishing line comprising a core yarn 2 colored with a predetermined colorant and an outer-layer yarn 3 being disposed in a braid form on a periphery of the core yarn 2 in such a manner that the core yarn 2 is prevented from contacting with other objects, wherein:
the core yarn 2 and the outer-layer yarn 3 are subjected to a drawing treatment, the outer-layer yarn 3 is constituted in such a manner that a space 4 is formed at locations where the braid structure defines openings therethrough or therebetween and color applied to the core yarn 2 is externally visible through the space 4, at least one of the core yarn 2 and the outer-layer yarn 3 comprises a plurality of filaments made of ultra-high molecular-weight polyethylene, the core yarn 2 colored with a predetermined colorant comprises each predetermined length of the core yarn 2 which is colored in a different color, and the outer-layer yarn 3 comprises a transparent or semi-transparent filament, and the color applied to the core yarn 2 is externally visible through the outer-layer yarn 3.

2. The fishing line according to claim 1, wherein the outer-layer yarn 3 is made transparent or semi-transparent by containing a surface-treatment agent, and thereby the color applied to the core yarn 2 is externally visible through the outer-layer yarn 3.

3. The fishing line according to claim 1, wherein the core yarn 2 is obtained by combining a plurality of filaments made of ultra-high-molecular-weight polyethylene.

\* \* \* \* \*